US012159150B2

(12) United States Patent
Riand et al.

(10) Patent No.: US 12,159,150 B2
(45) Date of Patent: Dec. 3, 2024

(54) SYSTEMS AND METHODS OF PREVENTING USER INTERFACE (UI) FLICKERING

(71) Applicant: Salesforce, Inc., San Francisco, CA (US)

(72) Inventors: Philippe Riand, Burlington, MA (US); Steffen Eckardt, Frankfurt (DE)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/103,551

(22) Filed: Jan. 31, 2023

(65) Prior Publication Data

US 2024/0256300 A1 Aug. 1, 2024

(51) Int. Cl.
G06F 9/451 (2018.01)
(52) U.S. Cl.
CPC .................... *G06F 9/451* (2018.02)
(58) Field of Classification Search
None
See application file for complete search history.

(56) References Cited

U.S. PATENT DOCUMENTS

| | | | | |
|---|---|---|---|---|
| 6,886,170 | B1 * | 4/2005 | Bahrs | G06F 8/38 715/764 |
| 7,164,422 | B1 * | 1/2007 | Wholey, III | G06F 8/34 345/440.1 |
| 7,316,001 | B2 * | 1/2008 | Gold | G06F 8/34 717/109 |
| 8,938,732 | B2 | 1/2015 | Levine | |
| 9,021,035 | B2 | 4/2015 | Auriemma | |
| 2004/0250241 | A1 * | 12/2004 | O'Neil | G06F 16/958 707/E17.116 |
| 2007/0067373 | A1 * | 3/2007 | Higgins | G06Q 30/00 |
| 2008/0109784 | A1 | 5/2008 | Levine | |
| 2008/0109801 | A1 | 5/2008 | Levine | |
| 2009/0037830 | A1 | 2/2009 | Kulkarni | |
| 2011/0119615 | A1 * | 5/2011 | Cisler | G06F 9/451 715/764 |

(Continued)

OTHER PUBLICATIONS

Burckhardt et al., "Reactive Caching for Composed Services: Polling at the Speed of Push," Proc. ACM Program. Lang., vol. 2, No. OOPSLA, Article 152. Publication date: Nov. 2018, 27 pages. (Year: 2018).*

*Primary Examiner* — Amelia L Tapp
(74) *Attorney, Agent, or Firm* — Butzel Long

(57) ABSTRACT

Systems and methods are provided for receiving, at a computing system, an expression in a formula language to generate a user interface to be displayed, where the expression includes data to be retrieved. The computing system may determine whether a first portion of the data for the expression has been retrieved from at least one data source when the user interface is to be generated based on a signal received by the computing system from the at least one data source. When the first portion of the data is available, the user interface may be output. When the signal is received by the computing system that the first portion of the data for the expression is not available, the computing system outputs the user interface without the first portion of the data and revises the user interface to include the first portion of the data when the first portion of data becomes available.

10 Claims, 3 Drawing Sheets

(56) References Cited

U.S. PATENT DOCUMENTS

| | | | |
|---|---|---|---|
| 2012/0150886 A1* | 6/2012 | Kwiatkowski | G06F 16/9574 |
| | | | 707/758 |
| 2014/0059140 A1 | 2/2014 | Auriemma | |
| 2015/0120605 A1* | 4/2015 | Xu | G06Q 10/063 |
| | | | 705/342 |
| 2021/0173729 A1 | 6/2021 | Riand | |
| 2021/0173878 A1 | 6/2021 | Riand | |
| 2021/0260772 A1 | 8/2021 | Eckardt | |
| 2021/0402613 A1 | 12/2021 | Eckardt | |
| 2022/0335152 A1 | 10/2022 | Riand | |

* cited by examiner

SYSTEMS AND METHODS OF PREVENTING USER INTERFACE (UI) FLICKERING

BACKGROUND

Presently, expression engines typically evaluate formulas synchronously, and generally do not have mechanisms to handle asynchronous data sources. Although Java™ and JavaScript™-based engines can return an object when dealing with an asynchronous data source, a user or consumer is required to handle the asynchronous results themselves, and a user interface generated will not display as intended until all of the necessary data for the user interface is retrieved. Typically, an unwanted flickering of a page of a user interface or webpage occurs, where the flickering is a result of the asynchronous nature of data providers and their inherent data retrieval. While the rendering of the page is a synchronous process, the data providers only start their asynchronous data retrieval when they are instantiated. The data is retrieved at a later point in time, and the page is then rendered and displayed.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

DETAILED DESCRIPTION

Figure 1:
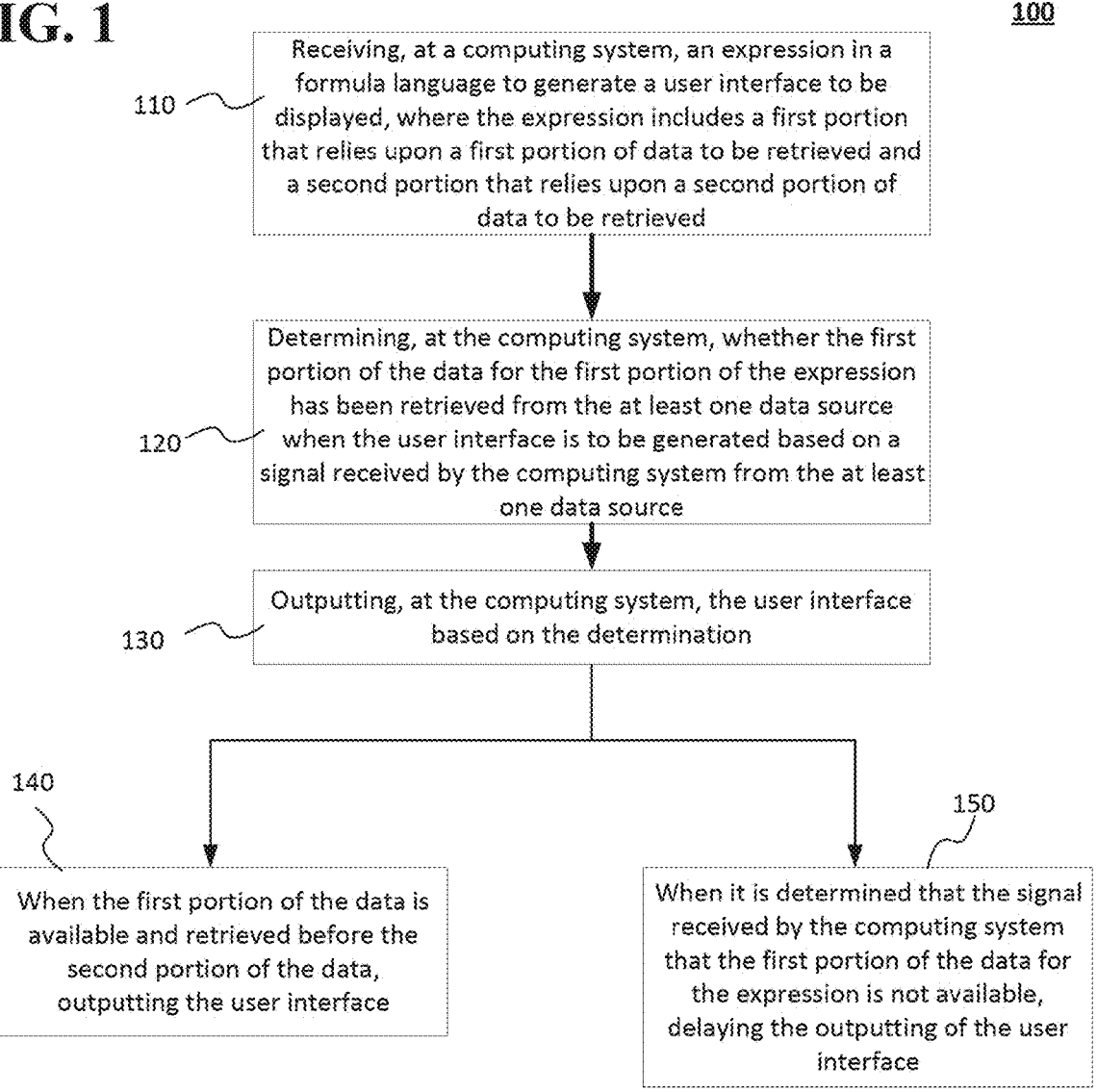
FIG. 1 shows an example method of generation of a user interface (UI) when using asynchronously-available data according to an implementation of the disclosed subject matter.

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of the disclosure can be practiced without these specific details, or with other methods, components, materials, or the like. In other instances, well-known structures and devices are shown in block diagram form to facilitate describing the subject disclosure.

In a personalized user interface (UI), such as used in a commerce website or application, some components of the UI may vary based on contextual data or other data and may be based on the availability of the contextual and/or other data. The contextual data and/or other data may include data related to the current user of the UI of the website. For example, when running a single page application, the contextual data may be retrieved asynchronously and may reach a client device that is displaying the application at different and/or unpredictable instants.

As the UI for the webpage and/or application page is rendered, the asynchronous retrieval of data may lead to UI flickering and/or the display of erroneous data. In some instances, some inaccurate information may be first displayed in the UI, and then replaced by more accurate data when displaying the UI. This may occur a plurality of times in the display and/or update of the display of the UI and may occur when an expression to be evaluated uses multiple asynchronous data sources.

Implementations of the disclosed subject matter may detect, at runtime of the UI of the webpage and/or application, if enough of the data of an expression has been retrieved. If enough of the data to evaluate the expression is not available, a signal may be sent that the expression evaluation may not be completed at this time. Based on the received signal, the data may be hidden until the presently unavailable data becomes available, and the expression may be evaluated.

Current systems have expression engines that evaluate formulas synchronously and are unable to handle asynchronous data sources. Although JavaScript™-based engines can return a Promise object to handle asynchronous data sources and Java™-based engines can use a Future< > object to handle asynchronous data sources, a user or consumer with current systems is required to deal with the asynchronous results themselves, as a user interface (UI) generated will not display as intended. Typically, an unwanted flickering of a page of a user interface or webpage occurs, where the flickering is a result of the asynchronous nature of data providers and their inherent data retrieval. While the rendering of the page is a synchronous process, the data providers only start their asynchronous data retrieval when they are instantiated. In addition to the unpleasant flickering, there can be exposure of data or areas that should only be accessible to a specific audience. Such an exposure in not an actual security problem, as the data displayed is component metadata that was transmitted to the browser. However, such an exposure may frustrate users who see such an exposure in the displayed UI.

Implementations of the disclosed subject matter provide systems and methods for generation of the UI when using asynchronously-available data by using signaling as to when data is available to evaluate an expression, and which stops the evaluation when the data is not available. The disclosed subject matter avoids generating a UI that causes flicker when displayed.

Figure 2:
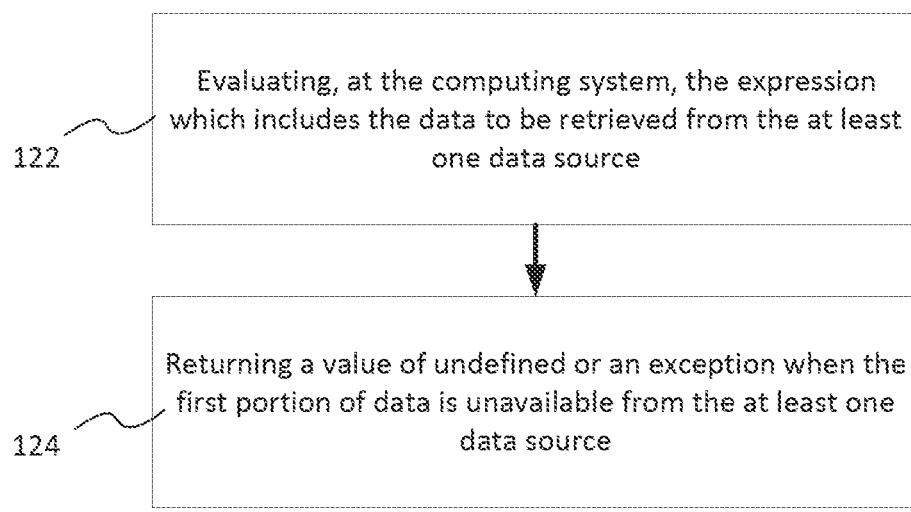
FIG. 2 shows example operations that may be performed in addition to those shown in FIG. 1 according to an implementation of the disclosed subject matter.
Figure 3:
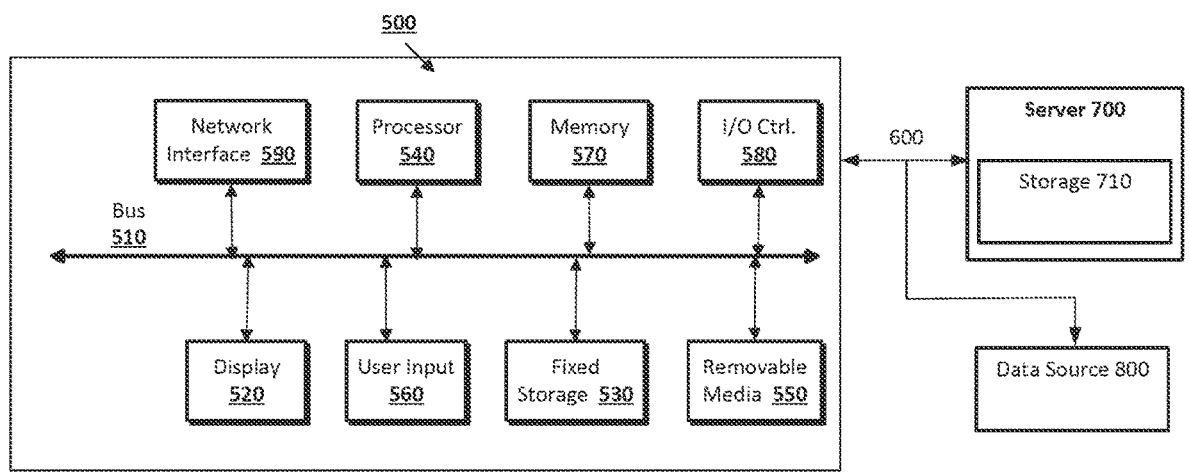
FIG. 3 shows a computer system according to an implementation of the disclosed subject matter.

FIGS. 1-2 show an example method 100 of generating of a user interface (UI) when using asynchronously-available data to avoid flickering according to implementations of the disclosed subject matter. As shown in FIG. 1, a computing system may receive an expression in a formula language to generate a user interface to be displayed at operation 110. The expression may include data to be retrieved from at least one data source communicatively coupled to the computing system at operation 110. The computing system may be computer 500 and/or server 700 shown in FIG. 3 and described below, and the data source may be data source 800 as shown in FIG. 3 and described below.

An expression may be a static string. Below is an example expression:

{! Product.Pricing.unitPrice*Cart.quantity}

The expression may include the actual expression (e.g., Product.Pricing.unitPrice*Cart.quantity) and the two delimiters (e.g., {! and}) that are used to distinguish an expression from a static string value. In the example expression above, Product.Pricing.unitPrice and Cart.quantity may be property accessors, and the * may be the operator. In the example, Product and Cart may be expression keys. Which data and/or object each of the expression keys refers to in the context of the current component may be determined at runtime. A list of data providers may be specified in a page that may be part of the webpage and/or application for the UI. The expression keys may be linked to one or more data providers. In some implementations, static expression strings may be converted at publishing time, and the converted strings may be further processed at runtime.

At operation 120 shown in FIG. 1, the computing system may determine whether a first portion of the data for the expression has been retrieved from the at least one data source when the user interface is to be generated based on a signal received by the computing system from the at least one data source. Using the example expression above, the computing system may determine whether the data for Product.Pricing.unitPrice is available from at least one data source (e.g., data source 800 shown in FIG. 3) based on a signal received by the computing system from the at least one data source.

FIG. 2 shows example operation of how the computing system may determine whether the first portion of the data for the expression at operation 120. For example, the computing system may evaluate the expression which includes the data to be retrieved from the at least one data source at operation 122. A value of undefined may be returned at operation 124 when the first portion of data is unavailable from the at least one data source. In some implementations, an exception may be returned rather than the value of undefined. In some implementations, the outputting the user interface of operation 120 may include having the computing system output the user interface without the first portion of data when the value of undefined or the exception is returned. In some implementations, the signal received by the computing system may be the undefined value or the exception.

Using the example above, the computing system may evaluate the expression {! Product.Pricing.unitPrice*Cart.quantity} at operation 122, and a value of undefined or an exception may be returned at operation 124 when the first portion of data (e.g., Product.Pricing.unitPrice) is unavailable from the at least one data source. If the first portion of data (e.g., Product.Pricing.unitPrice) is available, the data source may provide the data for Product.Pricing.unitPrice to the computing system.

At operation 130 shown in FIG. 1, the computing system may output the user interface based on the determination at operation 120, where it is determined whether a first portion of the data for the expression has been retrieved from the at least one data source. The user interface that is output at operation 130 may depend on whether the first portion of the data is available. For example, the user interface may be output when the first portion of the data is available at operation 140. Continuing the example above, the user interface may be output at operation 140 when the data for Product.Pricing.unitPrice for the expression {! Product.Pricing.unitPrice*Cart.quantity} is available. In another example, when it is determined signal is received by the computing system that the first portion of the data for the expression is not available at operation 150, the computing system may output the user interface without the first portion of the data. Continuing the example from above, when the data for Product.Pricing.unitPrice for the expression {! Product.Pricing.unitPrice*Cart.quantity} is not available, the user interface may be displayed without the data for at least Product.Pricing.unitPrice. The computing system may revise the user interface to include the first portion of the data when the first portion of data becomes available and outputting the revised user interface. Continuing the example, the computing system may receive the Product.Pricing.unitPrice data from the data source, and may update the user interface to include the Product.Pricing.unitPrice data.

In some implementations, the expression may include a first portion of the expression and a second portion of the expression. For example, the first portion of the expression may rely upon the first portion of the data, and the second portion of the expression may rely upon a second portion of the data to be retrieved from the at least one data source. Continuing the example from above, the first portion of the expression may be Product.Pricing.unitPrice, and the second portion of the expression may be Cart.quantity, where the expression is {! Product.Pricing.unitPrice*Cart.quantity}. In some implementations, the computing system may retrieve the first portion of the data and the second portion of the data asynchronously.

In some implementations, when the first portion of the data is retrieved before the second portion of the data, and the first portion of the expression may be evaluated to have a first result, the computing system may output the user interface before the second portion of the data is available. When the first portion of the data is retrieved before the second portion of the data, and the first portion of the expression is evaluated to have a second result (i.e., a different result), the computing system may delay the evaluation of the second portion of the expression and the outputting of the user interface until the data for the second portion of data is available.

For example, if the expression is: User.isGuest && Product.Price>30, the User.isGuest may be the first portion of the expression, and the Product.Price>30 may be the second portion of the expression. In this example, User.isGuest and Product.Price may be retrieved asynchronously and separately (e.g., from data source 800 shown in FIG. 3). If User.isGuest is retrieved first and if its value is false, then the expression is evaluated even through Product.Price is not yet available. That is, the expression may be evaluated, as Product.Price may not be needed to determine a final result. If User.isGuest is retrieved first and if its value is true, then the expression may not be evaluated until Product.Price is retrieved. That is, expressions may be used to return a result as soon as possible, which may enhance the user experience in a user interface.

In some implementations, an expression evaluated at runtime may return the value "undefined" or may return an exception in the case of unavailable data and may return the value "null" in the case of available data. The computing system may determine what elements of the UI should be displayed based on the value received from the data source.

Present systems are generally unable to determine data status at Expression Runtime. Implementations of the disclosed subject matter determine gives users of a data provider (i.e., the Expression Runtime) the possibility of determining the state of a provider's data. In some implementations, a new method hasData(prop?: string) may be included as part of the data provider public API (application program interface). The introduction of the hasData (prop?: string) may be non-invasive and fully backwards compatible.

In some implementations, the data provider API (e.g., located at the computer 500 and/or the server 700 shown in FIG. 3) may be extended with another method, hasData( ). This method may be used to actively query the availability status of the data. In some implementations, the availability of certain slices of data may be queried via an optional prop argument. In some implementations, there are no changes to the behavior of the existing getData( ) method, and all new behaviors are based on the introduction of the new hasData method. Data providers (e.g., services provided by the computing system, which may be computer 500 and/or server 700 shown in FIG. 3, such as an application and/or website) that depend on asynchronously obtained data may implement this new method (i.e., hasData(prop?: string)) to enable the desired consumer-level distinctness. An example of the getData( ) is shown below:

```
export default class ProductDataProvider extends DataProvider { @api
  getData( ): ProductData { return
    this.data;
  }
@api
hasData(prop?: string): boolean {
  return ...; // <-- Custom logic goes here
  }
}
```

In some implementations, an error may be thrown on the expression runtime side (e.g., by the computing system, which may be computer 500 and/or the server 700 shown in FIG. 3). An example tool to handle the error, and may be implemented within in a web runtime and/or expressions package in the form of a closure:

```
export function EXPR_CLOSURE(fn) { try {
    return fn( ) ?? null;
  } catch {
    return undefined;
  }
}
```

As some implementations use the hasData( ) method on the data provider side (e.g., data source 800 shown in FIG. 3), another tool called EXPR_PROVIDER may be used in the web runtime and/or expressions package:

```
export function EXPR_PROVIDER(provider) { if
    (!provider?.hasData?.( )) {
    throw new Error( );
  }
  return provider?.getData?.( );
}
```

For example, by using the tools EXPR_CLOSURE and EXPR_PROVIDER, the example expression {! Product.Details.id} may be translated into the following output in the future:

```
EXPR_CLOSURE(
  ( ) => EXPR_PROVIDER(data_provider).Details.id
)
```

Implementations of the presently disclosed subject matter may be implemented in and used with a variety of component and network architectures. FIG. 3 is an example computer 500 suitable for the implementations of the presently disclosed subject matter. As discussed in further detail herein, the computer 500 may be a single computer in a network of multiple computers. In some implementations, the computer 500 may display a user interface (UI) that is generated by the computer 500 and/or a server 700 based on data available for the UI from a Data source 800. As shown in FIG. 3, the computer 500 may communicate with the server 700 (e.g., a server, cloud server, database, cluster, application server, neural network system, or the like) via a wired and/or wireless communications network 600. The server 700 may include a storage device 710. The storage 710 may use any suitable volatile and non-volatile physical storage mediums, including, for example, hard disk drives, solid state drives, optical media, flash memory, tape drives, registers, and random access memory, or the like, or any combination thereof. The computer 500 and/or the server 700 may be communicatively coupled to the data source 800, which may any suitable volatile and non-volatile physical storage mediums, including, for example, hard disk drives, solid state drives, optical media, flash memory, tape drives, registers, and random access memory, or the like, or any combination thereof. The data source 800 and/or the storage 710 may provide data to the computer 500 and/or the server 700 via the communications network 600 to be used in the UI to be displayed on the computer 500.

The computer (e.g., user computer, enterprise computer, or the like) 500 may include a bus 510 which interconnects major components of the computer 500, such as a central processor 540, a memory 570 (typically RAM, but which can also include ROM, flash RAM, or the like), an input/output controller 580, a user display 520, such as a display or touch screen via a display adapter, a user input interface 560, which may include one or more controllers and associated user input or devices such as a keyboard, mouse, Wi-Fi/cellular radios, touchscreen, microphone/speakers and the like, and may be communicatively coupled to the I/O controller 580, fixed storage 530, such as a hard drive, flash storage, Fibre Channel network, SAN device, SCSI device, and the like, and a removable media component 550 operative to control and receive an optical disk, flash drive, and the like.

The bus 510 may enable data communication between the central processor 540 and the memory 570, which may include read-only memory (ROM) or flash memory (neither shown), and random access memory (RAM) (not shown), as previously noted. The RAM may include the main memory into which the operating system, development software, testing programs, and application programs are loaded. The ROM or flash memory can contain, among other code, the Basic Input-Output system (BIOS) which controls basic hardware operation such as the interaction with peripheral components. Applications resident with the computer 500 may be stored on and accessed via a computer readable medium, such as a hard disk drive (e.g., fixed storage 530), an optical drive, floppy disk, or other storage medium 550.

The fixed storage 530 can be integral with the computer 500 or can be separate and accessed through other interfaces. The fixed storage 530 may be part of a storage area network (SAN). A network interface 590 can provide a direct connection to a remote server via a telephone link, to the Internet via an internet service provider (ISP), or a direct connection to a remote server via a direct network link to the Internet via a POP (point of presence) or other technique. The network interface 590 can provide such connection using wireless techniques, including digital cellular telephone connection, Cellular Digital Packet Data (CDPD) connection, digital satellite data connection or the like. For example, the network interface 590 may enable the computer to communicate with other computers and/or storage devices via one or more local, wide-area, or other networks.

Many other devices or components (not shown) may be connected in a similar manner (e.g., data cache systems, application servers, communication network switches, firewall devices, authentication and/or authorization servers, computer and/or network security systems, and the like). Conversely, all the components shown in FIG. 3 need not be present to practice the present disclosure. The components can be interconnected in different ways from that shown. Code to implement the present disclosure can be stored in computer-readable storage media such as one or more of the memory 570, fixed storage 530, removable media 550, or on a remote storage location.

Some portions of the detailed description are presented in terms of diagrams or algorithms and symbolic representations of operations on data bits within a computer memory. These diagrams and algorithmic descriptions and representations are commonly used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "determining", "outputting", "revising", "evaluating", "returning", "retrieving", "delaying". or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

More generally, various implementations of the presently disclosed subject matter can include or be implemented in the form of computer-implemented processes and apparatuses for practicing those processes. Implementations also can be implemented in the form of a computer program product having computer program code containing instructions implemented in non-transitory and/or tangible media, such as hard drives, solid state drives, USB (universal serial bus) drives, CD-ROMs, or any other machine readable storage medium, wherein, when the computer program code is loaded into and executed by a computer, the computer becomes an apparatus for practicing implementations of the disclosed subject matter. Implementations also can be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium can be implemented by a general-purpose processor, which can transform the general-purpose processor or a device containing the general-purpose processor into a special-purpose device configured to implement or carry out the instructions. Implementations can be implemented using hardware that can include a processor, such as a general purpose microprocessor and/or an Application Specific Integrated Circuit (ASIC) that implements all or part of the techniques according to implementations of the disclosed subject matter in hardware and/or firmware. The processor can be coupled to memory, such as RAM, ROM, flash memory, a hard disk or any other device capable of storing electronic information. The memory can store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described to explain the principles of implementations of the disclosed subject matter and their practical applications, to thereby enable others skilled in the art to utilize those implementations as well as various implementations with various modifications as can be suited to the particular use contemplated.

The invention claimed is:

1. A method comprising:
receiving, at a computing system, an expression in a formula language to generate a user interface to be displayed, wherein the expression includes a first portion of the expression and a second portion of the expression, wherein the first portion of the expression relies upon a first portion of data to be retrieved from at least one data source communicatively coupled to the computing system, and the second portion of the expression relies upon a second portion of the data to be retrieved from the at least one data source, wherein the expression includes at least one expression key, wherein the at least one expression key is configured to be linked to the at least one data source, and wherein data of the at least one expression key is determined when the user interface is generated to be displayed;
determining, at the computing system, whether a first portion of the data for the first portion of the expression has been retrieved from the at least one data source when the user interface is to be generated based on a signal received by the computing system from the at least one data source; and
outputting, at the computing system, the user interface based on the determination, wherein:
when the first portion of the data is retrieved before the second portion of the data, and the first portion of the expression is evaluated to have a first result, outputting the user interface before the second portion of the data is available; and
when the first portion of the data is retrieved before the second portion of the data, and the first portion of the expression is evaluated to have a second result, delaying the evaluation of the second portion of the expression and the outputting of the user interface until the data for the second portion of data is available.

2. The method of claim 1, wherein the determining whether the first portion of the data for the expression has been retrieved comprises:
evaluating, at the computing system, the expression which includes the data to be retrieved from the at least one data source; and
returning a value of undefined or an exception when the first portion of data is unavailable from the at least one data source.

3. The method of claim 2, wherein the outputting the user interface further comprises:
outputting, at the computing system, the user interface without the first portion of data when the value of undefined or the exception is returned.

4. The method of claim 2, wherein the signal received by the computing system is the undefined value or the exception.

5. The method of claim 1, further comprising:
retrieving, at the computing system, the first portion of the data and the second portion of the data asynchronously.

6. A system comprising:
a computing system having a processor and a memory that is configured to:
receive an expression in a formula language to generate a user interface to be displayed, wherein the expression includes a first portion of the expression and a second portion of the expression, wherein the first portion of the expression relies upon a first portion of data to be retrieved from at least one data source communicatively coupled to the computing system, and the second portion of the expression relies upon a second portion of the data to be retrieved from the at least one data source, wherein the expression includes at least one expression key, wherein the at least one expression key is configured to be linked to the at least one data source, and wherein data of the at least one expression key is determined when the user interface is generated to be displayed;
determine whether a first portion of the data for the first portion of the expression has been retrieved from the at least one data source when the user interface is to be generated based on a signal received by the computing system from the at least one data source; and
output the user interface based on the determination, wherein:
when the first portion of the data is retrieved before the second portion of the data, and the first portion of the expression is evaluated to have a first result, output the user interface before the second portion of the data is available; and
when the first portion of the data is retrieved before the second portion of the data, and the first portion of the expression is evaluated to have a second result, delay the evaluation of the second portion of the expression and the output of the user interface until the data for the second portion of data is available.

7. The system of claim 6, wherein the computing system determines whether the first portion of the data for the expression has been retrieved by evaluating the expression which includes the data to be retrieved from the at least one data source, and returning a value of undefined or an exception when the first portion of data is unavailable from the at least one data source.

8. The system of claim 7, wherein the computing system outputs the user interface without the first portion of data when the value of undefined or the exception is returned.

9. The system of claim 7, wherein the signal received by the computing system is the undefined value or the exception.

10. The system of claim 6, wherein the computing system retrieves the first portion of the data and the second portion of the data asynchronously.

\* \* \* \* \*